United States Patent [19]

Lundbäck

[11] 4,394,841
[45] Jul. 26, 1983

[54] VESSEL FOR RECOVERING MATERIAL

[76] Inventor: Per B. Lundbäck, Västerleden 48 nb., 199 00 Enköping, Sweden

[21] Appl. No.: 187,327

[22] Filed: Sep. 15, 1980

[51] Int. Cl.³ ............................................ B63B 35/28
[52] U.S. Cl. ................................... 114/26; 210/242.3; 37/55; 198/314
[58] Field of Search ...................... 210/242.3, DIG. 26; 114/26, 56; 56/9; 37/55; 198/312–318, 862

[56] References Cited

U.S. PATENT DOCUMENTS

| | | | |
|---|---|---|---|
| 484,715 | 10/1892 | Hilton | 37/55 |
| 2,386,295 | 10/1945 | Daniels | 37/55 |
| 2,508,087 | 5/1950 | Bailey | 37/55 |
| 2,753,971 | 7/1956 | Ball | 198/514 |
| 3,744,615 | 7/1973 | Plaquet | 198/314 |
| 3,762,558 | 10/1973 | Anderson | 210/242.3 |

Primary Examiner—Trygve M. Blix
Assistant Examiner—D. W. Keen
Attorney, Agent, or Firm—Gifford, VanOphem, Sheridan & Sprinkle

[57] ABSTRACT

A vessel to recover material in the form of oil and timber from the surface or bottom of the sea comprises a conveyor, which projects down below the water level and is mounted to the vessel in an elevatable manner in order to enable variation of the level of the lower portion of the conveyor in dependence upon the level on which the material to be recovered is present. The conveyor is pivotably mounted to the vessel about an axis extending generally horizontally and transversely to the longitudinal direction of the vessel.

19 Claims, 12 Drawing Figures

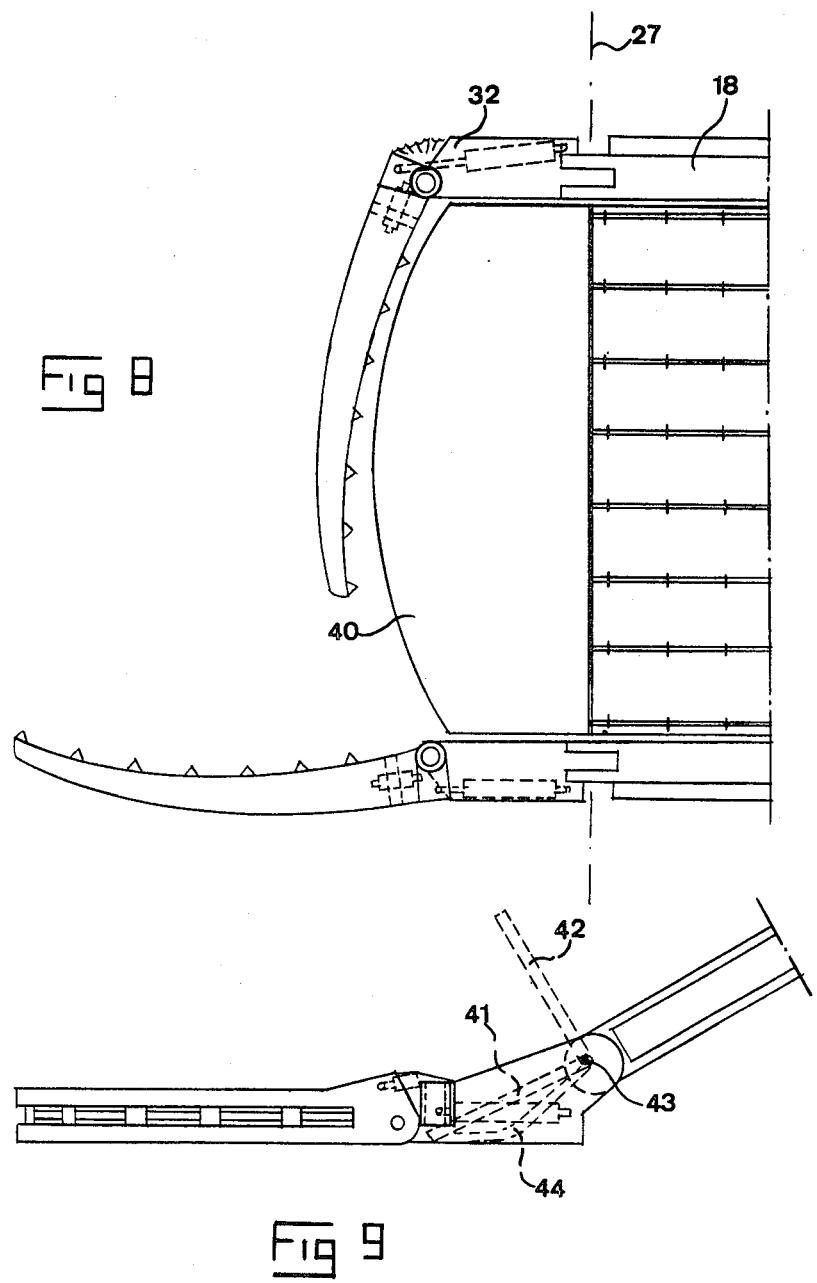

VESSEL FOR RECOVERING MATERIAL

The problem with oil pollution from vessels in the sea has become more and more serious in recent time. The preparedness to pick up oil emissions from the water is for natural reasons imperfect. This is due to the fact that it is very costly to purchase complicated special equipment, which is used rather seldom, and keep the same prepared. As an example of such special equipment, reference is made to vessels of the kind defined in the preamble of claim 1. Although such vessels (the British patent specification No. 1 296 783 and the French patent specification No. 1 557 657 have a good capacity to pick up oil, they are used in a very small number since they are very expensive and for the most time lie in harbours waiting for use. Thus, oil emissions are normally handled with other means, such as different types of dispersing agents which are spread in the oil slicks by means of conventional vessels. Such agents dissolve the oil layer and the oil sinks. This does not eliminate the disastrous effects of the oil on the nature. The oil often reaches sensitive beach areas, from which the oil must be removed by primitive means.

The object of this invention is to create economical possibilities to widely use vessels of the kind indicated above, which vessels in the previous embodiments have had a conveyor, typically a belt conveyor, provided with a float and floating on the water.

This object is obtained by the features defined in the latter portion of claim 1. By this solution, it is possible to pick up not only oil from the surface of the water, said conveyor having its lower portion located rather close to the surface of the water, but also other material, especially wood material, such as timber and fibres, from the bottom of the sea, said conveyor having its lower portion located adjacent the bottom of the sea. Thus, the vessel according to the invention has a considerably widened field of use. Along the beaches, there are outside pulp factories and float ways considerable amounts of timber and wood fibres on the bottom. The vessel according to the invention makes it possible to pick up such material by means of the conveyor, which at its lower portion may comprise an assembly to feed the timber or fibre material onto the conveyor. This wood material will be a useful contribution of raw material to the wood industry and simultaneously, a deeply needed clearing of the bottom areas will be made possible. The alternative field of use for the vessel according to the invention makes the vessel motivated from the view of expenses since the vessel, when it is not used to pick up oil, may be used to pick up timber and wood fibres from the bottom of the sea.

Other advantages featureous of the invention appear from the appended claims.

With reference to the appended drawing, a more specific disclosure of an embodiment according to the invention will follow hereinbelow.

In the drawings

FIGS. 8 and 9 are view similar to FIGS. 6 and 7 of an alternative embodiment;

Figure 2:
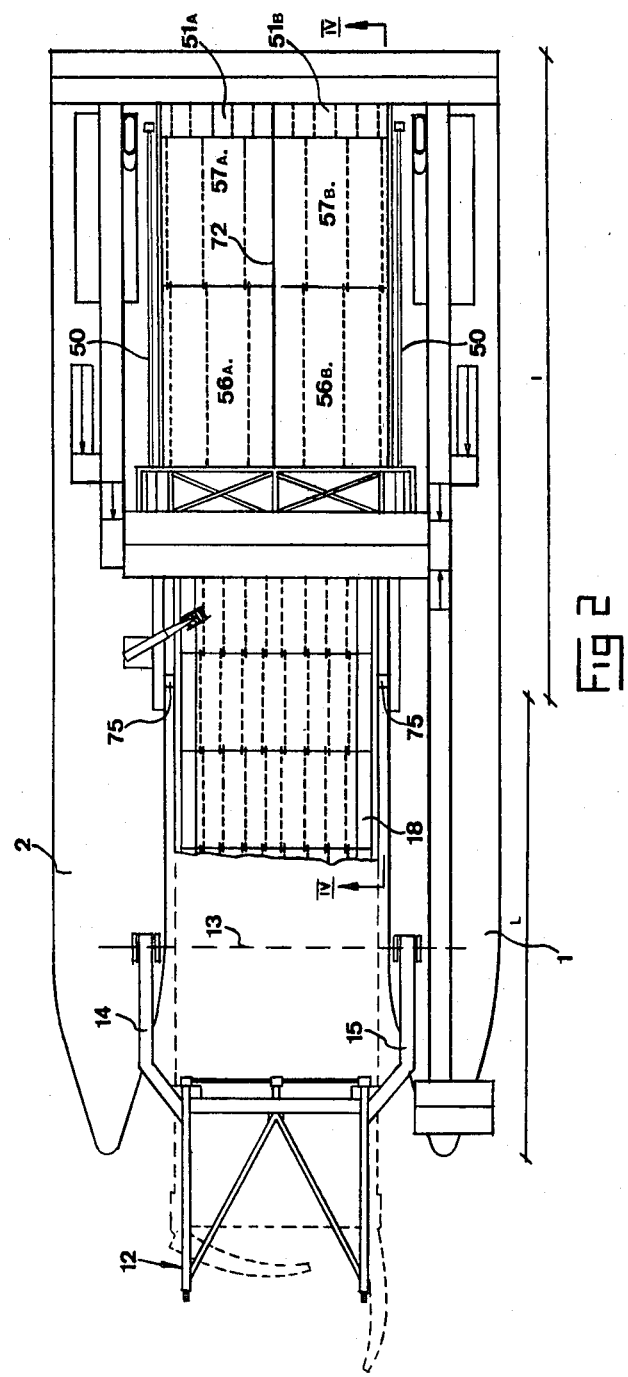
FIG. 2 is a plan view of the vessel, certain details having been omitted for the sake of clarity.
Figure 3:
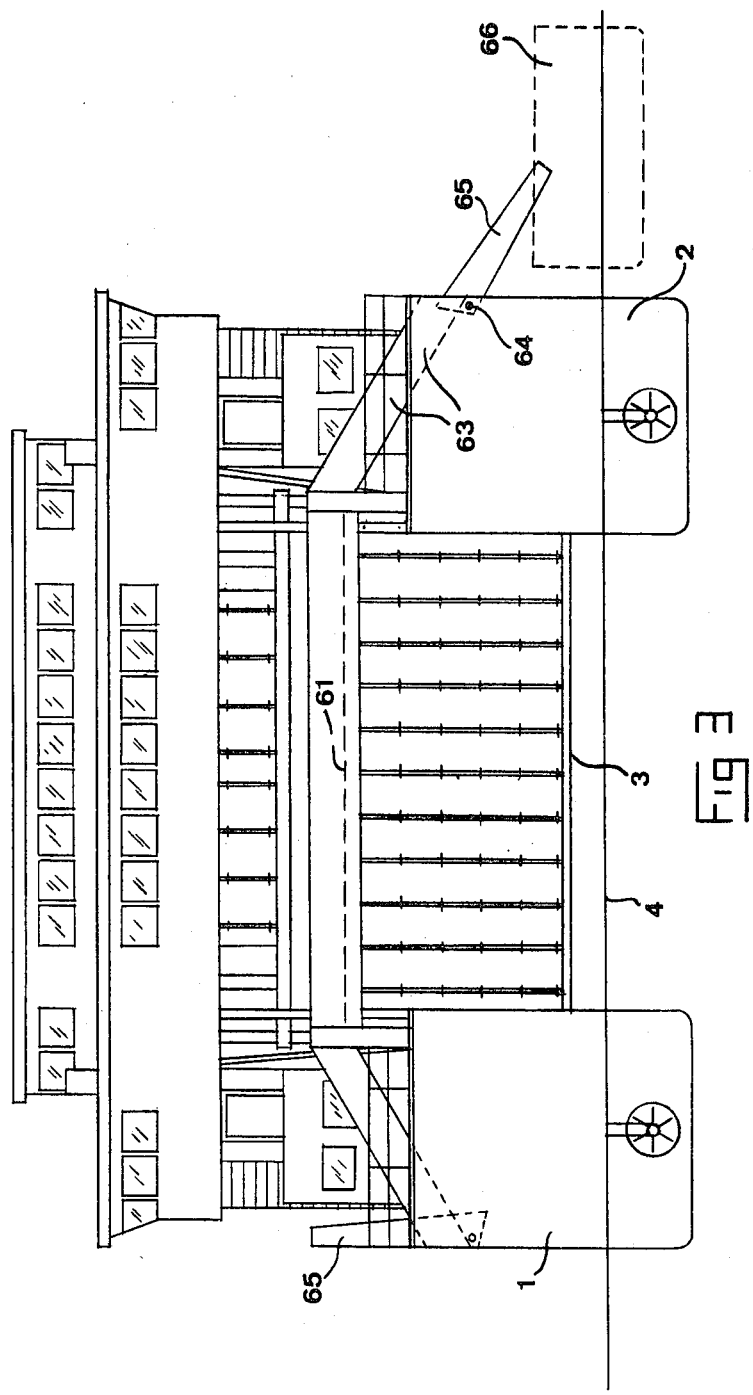
FIG. 3 is a view from the stern of the vessel.

The vessel illustrated in the drawings is, as best appears by FIGS. 2 and 3, of the type comprising two hull portions 1, 2, which are spaced sidewardly from each other and long and narrow and parallel. The hull portions 1, 2 are generally not built together along a certain distance from the stem of the vessel and in a direction towards the stern thereof, at least not by building elements located adjacent the water line or therebelow. Said distance is indicated in FIG. 2 by means of an L. A certain distance 1 indicated in FIG. 2 from the stern of the vessel and in a direction towards the stem, the hull parts 1 and 2 are interconnected or built together. Thus, the vessel has basically an U-like shape in plan view. The vessel may e.g. have an overall length of about 60 meters and a width of about 25 meters. The distance L and 1 may be generally equal. The lower surface 3 of the elements interconnecting the hull portions 1 and 2 is preferably disposed above the water line 4 when the vessel is unloaded, i.e. only the hull portions 1 an 2 are supporting. The surface 3 is intended to reach the water level 4 when the vessel has received a certain load so that the intermediate part between the hull portions 1 and 2 will give a certain additional carrying capacity.

The vessel has a conveyor 5, a portion of which is adapted to be located below the water level 4 on recovery of material from the water and/or from the bottom of the sea, said conveyor 5 being adapted to transport the material upwardly out of the water. The conveyor 5 is mounted to the vessel in an elevatable manner to enable variation of the level of the lower portion or end 6 of the conveyor in dependence upon the level, on which the material to be picked up is present. The direction of feed of the conveyor is indicated by arrow 7.

The conveyor is at its upper portion or end 8 pivotally mounted to the vessel about an axis 9 extending transversely relative to the longitudinal direction of the vessel and generally horizontally. In this way, the conveyor 5 is in its entirety pivotable an the infinite manner between different positions of inclination, e.g. between the position illustrated in FIG. 1 with full lines and the position illustrated with dashed lines, said positions corresponding to different bottom levels 10, 11. These two exemplified positions are relevant for recovery of e.g. timber from the bottom of the sea. As will be described hereinafter the conveyor 5 is additionally privotable upwardly in connection with oil recovery from the surface of the water. In practice, the conveyor 5 may be pivotable between a generally vertical position and generally horizontal position. An even wider pivotal area is conceivable.

In order to pivot the conveyor 5 between its different positions, there is provided a lifting device or crane 12, which is rotatable about a generally horizontal axis 13 (FIG. 2). The lifting device may comprise two arms 14, 15, one of which is supported on hull portion 1 and the other of which is supported on hull portion 2. Lifting cylinders 16, preferably two, serve to rotate the lifting device about axis 13. The conveyor 5 is connected to the lifting device via a cable system or the like 17, which is connected to the conveyor at the side pieces 18 thereof.

Figure 4:
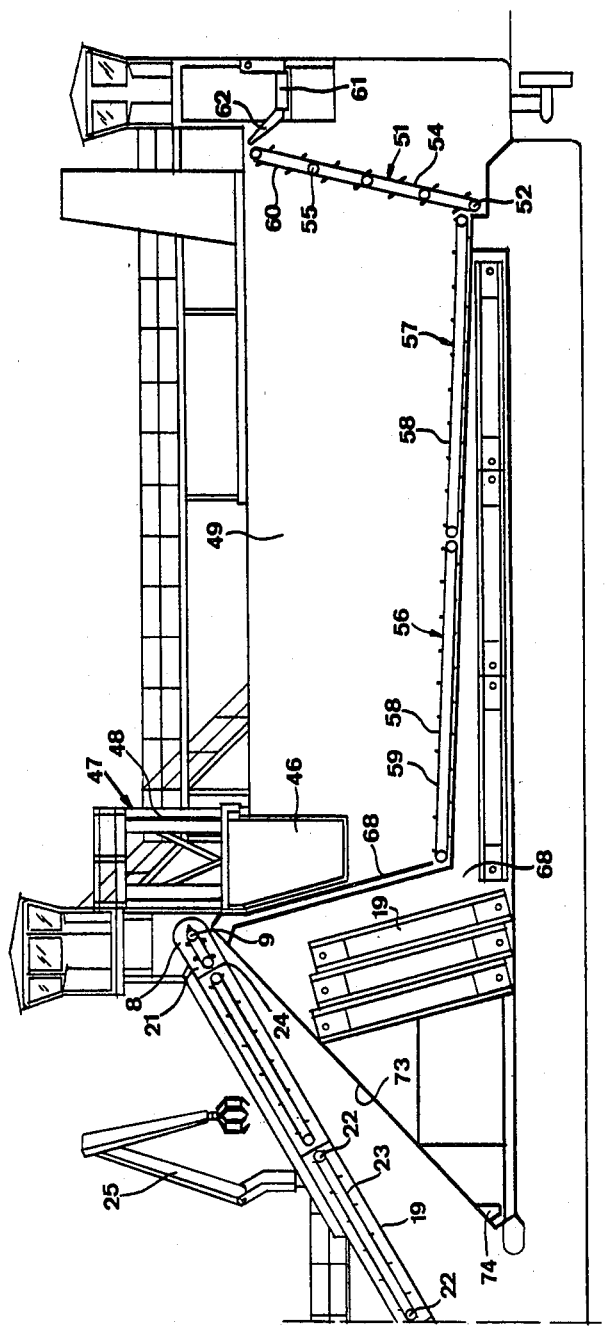
FIG. 4 is a partly cut side view of a part of the vessel along the line IV—IV in FIG. 2.

The conveyor 5 is assembled from a pluarality of sections 19, having a standardized length. The end elements 20 and 21 of the conveyor 5 are however, designed in a special manner. The number of the sections 19 may be varied to enable a change of the total length of the conveyor 5. Each section is complete with necessary equipment, such as shafts 22 (FIG. 4), bearings and a preferably endless or continuous belt or mat 23, which is easily replaceable with another one. The belt or mat 23 is provided with dogs or fingers or the like for timber, said dogs or fingers being easily removable from the belt and exchangeable. Instead of a belt or mat 23 it is also conceivable to use a plurality of chains or the like arranged side by side and also having removable dogs or fingers. The shafts 22 extend transversely to the longitudinal direction of the conveyor 5 and generally horizontally. One or both shafts 22 in each section 19 are driven from the vessel by means of a transmission, e.g. of chain type, which may be housed in the side pieces 18 of the sections 19, said side pieces forming a continuous space extending along the conveyor 5. Since the conveyor 5 is assembled by a number of standarized sections, it may easily be shortened or lengthened when need arises. This may be carried out in the following manner: At the upper end of the conveyor 5, the previously described end element 21 is located and said element is adapted to continuously remain pivotably mounted to the vessel. This element 21 includes the main drive device for the different belts or mats 23. At the joint between said element 21 and the next section 19, a division is carried out and with the exception of element 21, the entire conveyor is lowered to a certain point or holding arrangement, where the conveyor 5 is held during the lengthening work. Between the lowered portion of the conveyor 5 and the element 21 there is now a free space. As will be explained hereinafter, a number of reserve sections 19 are housed in the vessel and such a reserve section may now be taken out and inserted into the free space, preferably by means of a crane 25 (FIG. 4). The reserve section is connected to the element 21, whereafter the previously mentioned, lowered part of the conveyor is moved upwardly and attached to the reserve section. In a similar manner, more than one reserve section may be inserted into the conveyor 5 to obtain the desired lengthening and in addition, the conveyor 5 may be shortened with an arbitrary number of sections 19.

It is preferred that the connection of the sections 19 to each other and to the end elements 20, 21 is somewhat flexible or resilient so that the conveyor 5 may yield somewhat during stresses. The flexibility in the connections is preferably such that the conveyor 5 may be bent somewhat in a vertical plane and possibly also so that a certain reduction of length may occur. The dogs or fingers on the belts or mats 23 are intended for timber or other solid objects and are removed when the conveyor 5 is to be modified for oil recovery. Thereafter, a single continuous, endless mat or web is applied over all belts or mats 23 on the sections 19 and the elements 20 and 21. In this way, recovered oil will be transported from the surface of the water up into the vessel on the mat or web extending over the belts 23 and difficulties which could have occured during transfer between the individual belts 23 of the sections are eliminated. As will be described hereinafter, the conveyor 5 is normally shortened when being converted for oil recovery.

The conveyor 5 is at its lower end 6 provided with a feed assembly 26 (see also FIGS. 6 and 7) adapted to feed timber, wood fibres or other goods or material present at the bottom of the sea onto the conveyor 5. In order to enable the feed assembly 26 to follow the topography of the bottom of the sea, the feed assembly 26 is as a whole pivotably connected to the conveyor 5 about an axis 27, which extends transversely relative to the conveyor 5 and generally horizontally. The assembly 26 comprises at least two feed members 28, 29, which are pivotably movable about, during use, generally vertical shafts 30 by means of fluid cylinder means 31 hingedly connected between the respective arm-like feed member 28, 29 and a body 32 of the assembly 26. The feed members 28, 29 are movable between a first extended position (see the position for member 29 in FIG. 6) and a second position (see the position for member 28), in which the member is retracted or folded towards the lower end 6 of the conveyor 5. In addition, the feed members 28, 29 are adapted to be alternately pivoted to and fro between said positions so that when one feed member commences its pivoting movement inwardly, the other feed member commences its pivoting movement outwardly. To avoid collision between the feed members and to avoid that the feed members move material away from the conveyor, each of the feed members (FIG. 7) comprises a first part 33, which is rotatable about the axis of the shaft 30, and a second part 34, which is pivotable in a generally vertical plane relative to the first part 33 about a generally horizontal axis 35 by means of a fluid cylinder device 36. The part 34 is the proper feed part of feed member 29. By the described possibility to pivot about axis 35 each of the feed members is capable of being pivoted from its extended position to its retracted position in a generally horizontal plane and the part 34 of the feed member may be pivoted upwardly about axis 35 when it is in its retracted position and then pivoted outwardly to the extended position, wherein the part 34 again can be lowered about axis 35. The above described orientation of the axes of the shaft 30 and 35 is related to the normal position illustrated in the drawings; if the feed assembly 26 is pivoted to another position about axis 27 the orientation of the axes will change in a corresponding degree. The important matter is that the axes of the shafts 30 are generally perpendicular to the axis 27 and that the axes 35 extend generally perpendicular to the axes of the shafts 30.

The part 34 of each feed member may be provided with openings 37 or the like to enable water passage and suitable gripping projections 38. The parts 34 are preferably somewhat curved.

The feed assembly 26 also comprises a smaller conveyor 39 adapted to receive logs, fibres or the like from the feed members and transport such material onto the main conveyor 5, more specifically the belt 23 of the end unit 20. The conveyor 39 is also of belt or chain type and accompanies the pivotal movements of the body 32 about axis 37. The conveyor 39 comprises shafts (not illustrated) to cause a belt, a mat or chains to rotate and the upper surface or plane of the conveyor 39 may preferably be somewhat inclined in relation to the upper transport surface of the main conveyor 5.

Figure 6:
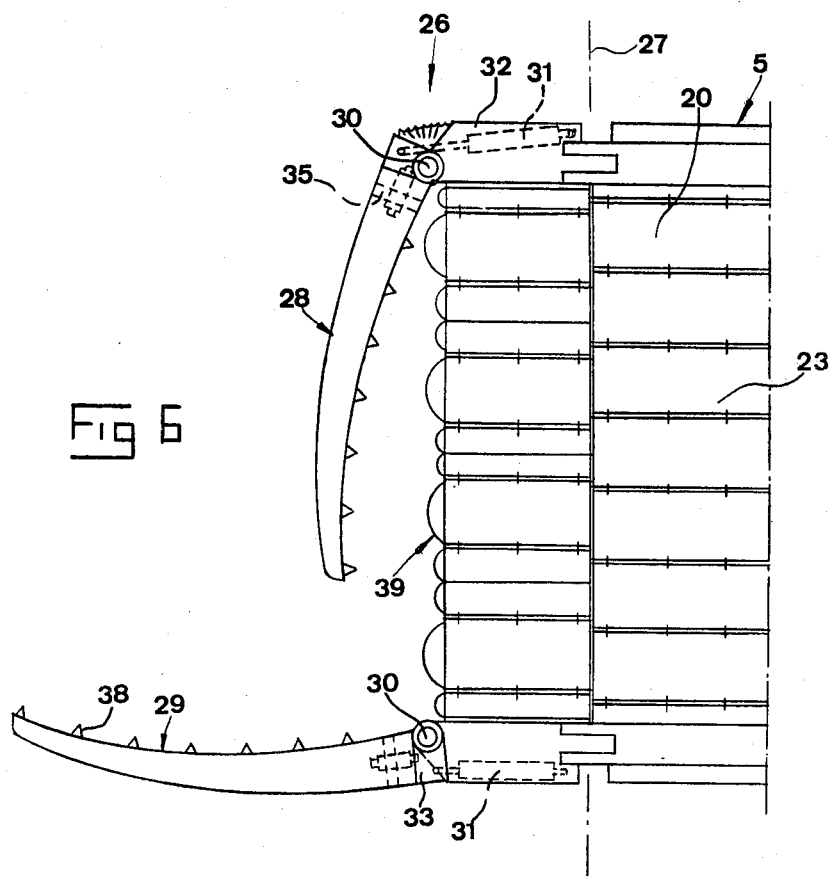
FIGS. 6 and 7 are a plan view and a side view respectively of a feed assembly arranged at the lower end of the conveyor.
Figure 7:
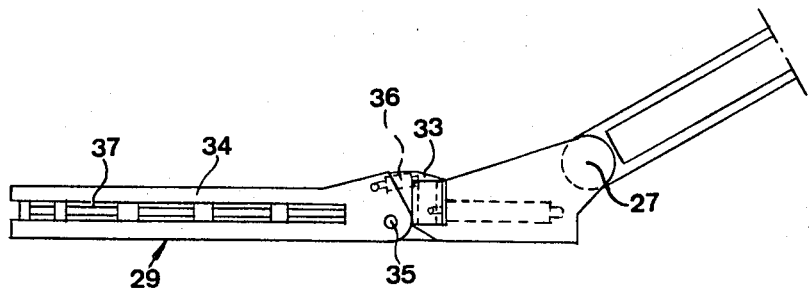

In the embodiment according to FIGS. 8 and 9, the conveyor 39 according to FIGS. 6 and 7 has been replaced by a flap 40, which is pivotable between the positions 41 and 42 illustrated in dashed lines in FIG. 9 about an axis 43, which is generally parallel to axis 27. The flap 40 may possibly be slightly flexible, at least at its outer end, so that the flap 40 may assume the position indicated with dashed lines in FIG. 9 and with the numeral 44, in which a portion of the flap has been bent in correspondence to the bottom surface. In that case, the flap 40 will during use pivot between the positions designated 42 and 44. To pivot the flap 40, a suitable fluid cylinder device (not illustrated) acting between the body 32 and the flap is used. The flap 40 may be pivotably connected to the side pieces 18 of the conveyor 5 or to the body 32, which as in the previous embodiment is in its entirety pivotable about axis 27. In other respects, the embodiment according to FIGS. 8 and 9 corresponds to the previous embodiment according to FIGS. 6 and 7. During use, the flap 40 will carry out a stroke of work to move material onto the conveyor 5 after each pivotal movement inwardly of the feed members 28, 29. Thus, the flap 40 will work with a frequency, which is twice as great as the pivotal frequency for one of the feed members.

Figure 1:
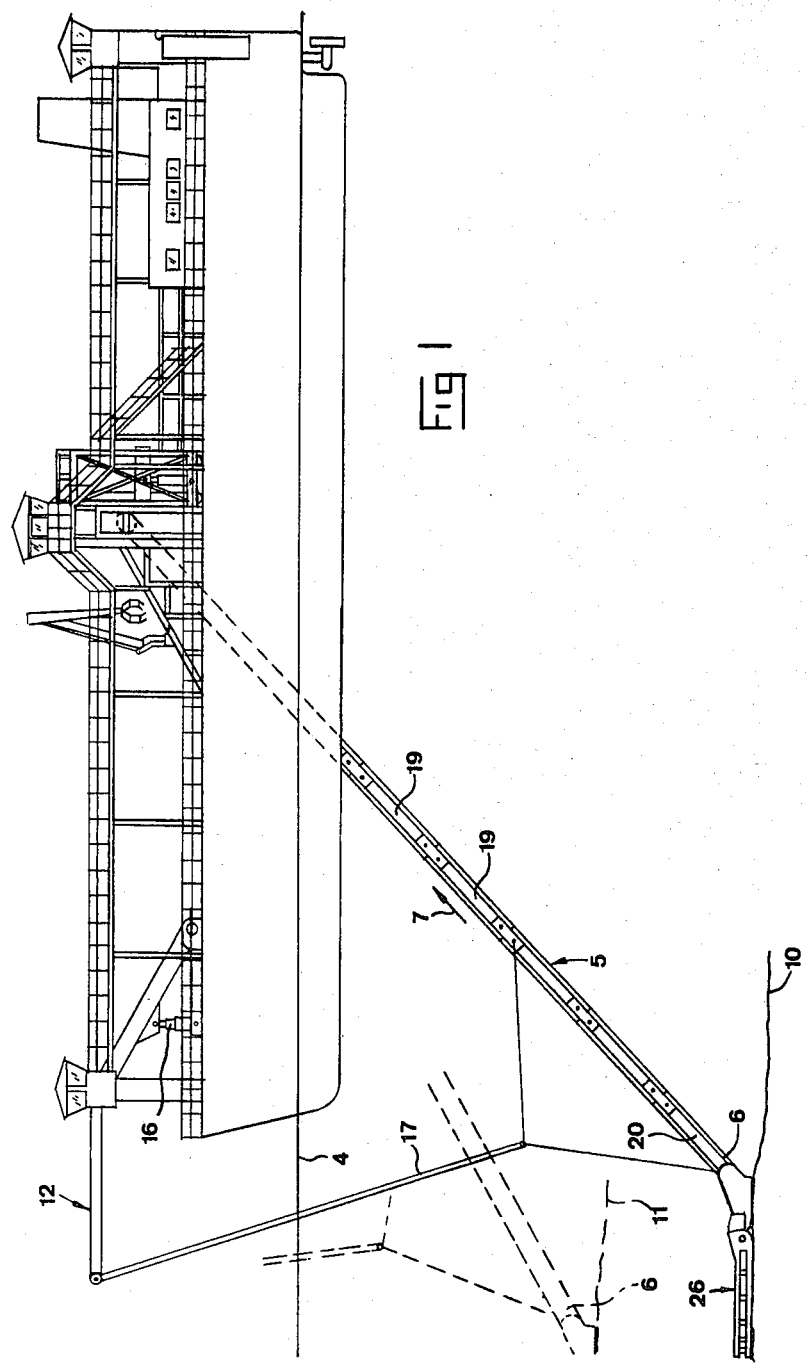
FIG. 1 is a side view of the vessel.

As is indicated in FIG. 1 and described above, the feed assembly 26 may, while adapting to the topograpy of the bottom, pivot about axis 27 as a unit. It is possible to provide the feed assembly 26 with a propelling device so that the assembly will be automotive, i.e. capable of moving forwardly and exerting tractive force on the vessel via the conveyor 5. According to an alternative embodiment, the feed assembly 26 may be designed as a slide sliding on the bottom. Different configurations of the bottom may motivate use of different types of feed assemblies, and it is therefore essential that the assembly is easily removable and replaceable by another assembly of a modified embodiment.

When the vessel is used to recover timber or the like from the bottom of the sea, the position of the lower end of conveyor 5 and the feed assembly 26 must be modified in dependence upon the depth of the water and this is carried out by means of lifting device 12. According to a preferred embodiment, the lifting device 12 is adapted to be automatically controlled in dependence upon a measuring device such as an echo-sound device or the like, sensing the water depths immediately ahead of the assembly 26. Means for adjusting the position of a pivotable conveyor in the general type of vessel to which this invention pertains are well known in the art and are not further described herein. If a sudden change of depth would be present in the direction of movement of the vessel, the measuring device will register that change and give an output signal, which is used to put the fluid cylinder device 16 in operation to lift the conveyor in a necessary degree and as rapid as is necessary to avoid damages on the conveyor.

The described cable system 17, which is attached to the conveyor at several points along the length thereof, enables a preferable distribution of the lifting force on the conveyor. A decrease of the necessary lifting force on the cables is obtained if the conveyor 5 or the side pieces of the sections 19 are made water-tight and used as floats. A suitable control system should be provided to fill these floats with water and evacuate water therefrom so that the weight of the conveyor can be balanced within desired limits.

As appears by FIGS. 4 and 5 a load pocket 46 is located at the upper end 8 of the conveyor 5 and somewhat below the same, said pocket having a width which is at least equal to the width of the conveyor and being (FIG. 4) carried by a load transportation device 47, which preferably may be adapted to raise and lower the pocket 46 along vertical guides. The door crane-like device 47 is movable to and fro in the longitudinal direction of the vessel above a hold 49 in the vessel and along rails 50 or similar guides (FIG. 2). The hold 49, which is disposed between the hull portions 1, 2, has a conveyor 51, which is pivotably movable about a generally horizontal axis 52 between a lowered position (FIG. 5), in which the conveyor 51 is capable of transporting goods into and out of the hold 49 through an opening 53 at the stern of the vessel, and a raised position (FIGS. 3 and 4) in which the conveyor 51 forms a wall-like closure of the hold 49. The conveyor 51 has one or more bands or chains 54 which are endless and arranged about a number of guide and drive shafts 55. The belt or chains 54 have, as will be described hereinafter, removable dogs or fingers for logs or the like. As is apparent from the drawings, the bottom of the hold 49 slopes in a direction towards the stern and said bottom is formed by at least two conveyors 56, 57, which are disposed after each other in the longitudinal direction thereof and which have endless feeding belts or chains 58 with removable dogs or fingers 59 for timber or the like. The upper parts of the belt or chains of the conveyors 56, 57 lie generally in the same plane and have a width generally equal to the width of the hold 49. The direction of feed of the conveyors 51, 56, 57 is reversible and parallel to the longitudinal direction of the vessel.

In its upper position (FIG. 4), the conveyor 51 has its free end 60 located adjacent to another conveyor 61, which, with the assistance of a guide plate 62, is adapted to receive timber or the like from the end 60 of the conveyor 51. The conveyor 61 is also of belt or chain type and has its direction of feed extending transversely relative to the longitudinal direction of the vessel (FIG. 3). Also the conveyor 61 is driven in a reversible manner so that the same can move goods such as logs to the left or to the right as illustrated in FIG. 3. The conveyor 61 is at least as wide as the conveyor 51 and communicates at both ends thereof with guide channels 63, each of which is extending transversely to the longitudinal direction of the vessel, slopes downwardly and opens at the side of the vessel in the hull portions 1 and 2 respectively. An outlet flute 65 is pivotable about a horizontal axis 64 extending in the longitudinal direction of the vessel and adapted to guide goods from the channel 63 to a desired position in e.g. a barge 66 or the like. As illustrated to the left in FIG. 3, the guide flutes 65 are pivotable upwardly into an inactive position for transport.

Figure 5:
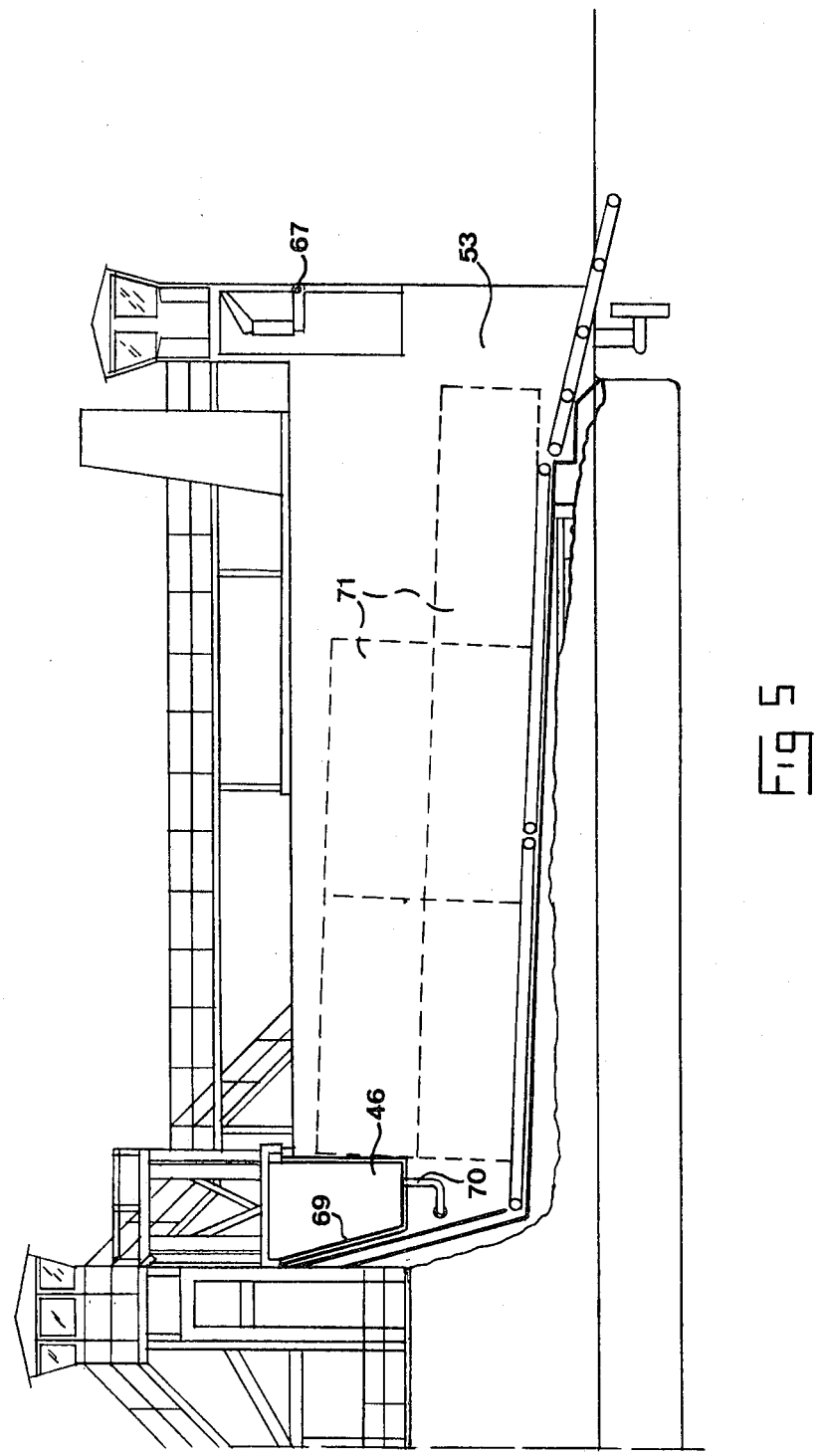
FIG. 5 is a partly cut side view somewhat similar to FIG. 4 and illustrating a hold of the vessel during oil recovery.

As is illustrated in FIG. 5, the guide plate 62 and preferably also the conveyor 61 are pivotable upwardly into an inactive position about a generally horizontal axis 67 extending transversely relative to the longitudinal direction of the vessel to enable the guide plate 62 and the conveyor 61 to be pivoted away when the conveyor 51 is to be lowered into the position in FIG. 5.

The logs picked up by conveyor 5 fall, when the load pocket 46 is not present, directly into the hold 49 along the foward sloping end wall 68 of the hold. The bottom conveyors 56, 57 enable displacement of the logs towards the stern to obtain as uniform filling of the hold 49 as possible. If the load pocket 46 is used, it enables a more uniform distribution of the logs in the hold 49 in that the logs fall down into the pocket 46, which can be moved toward the stern by the load transportation device 47. The pocket 46 has preferably a bottom which may be opened, so that the logs therein can be unloaded at a desired location along the length of the hold 49. When logs are to be taken out from the hold 49, the conveyors 56, 57 and 51 are operated so that the conveyors 56 and 57 feed logs to the conveyor 51, which, being in the position according to FIG. 4, may lift the logs by its dogs or fingers and deliver the same onto the conveyor 61, which in turn delivers the logs in the desired direction transversely of the vessel down into said barge 66 or the like. If the vessel is at a quay, the outlet flute may of course communicate with a suitable goods reception device on the quay. Alternatively, the conveyor 51 may of course be pivoted downwardly from the position in FIG. 4 to the position in FIG. 5 or any position therebetween to deliver logs rearwardly to a suitable reception device.

In the state illustrated in FIGS. 1-4, the vessel is adapted to pick up timber or other material from the bottom of the sea. In the following manner, the vessel may be modified from this state to recover oil from the surface of the sea: In the manner described above, the length of the conveyor is preferably shortend by removing a number of sections 19 since the length of the conveyor normally may be considerably shorter during oil recovery from the surface of the sea. Furthermore, the feed assembly 26 may be removed. When the conveyor 5 has a desired length, it is raised, by means of lifting device 12, into a horizontal position between the forward parts of the hull portions 1, 2. The dogs or fingers for timber transportation, which previously had been mounted on the belt or chains 23, are removed and the previously described web or mat is put over the sections of the conveyor 5 used during oil recovery. Subsequently, the conveyor 5 is adjusted by means of the device 12 so that it assumes a suitable inclination with the lower portion of the conveyor located somewhat below the water surface 4. The sections 19 not being used may be stored into a space 68' partially below the conveyor 5 and partially below the hold 49. The load pocket 46 is released from the load transportation device 47 and rigidly mounted in the position in FIG. 5 so that oil recovered by means of the conveyor 5 may be delivered directly into the pocket. The pocket 46 is preferably provided with a container-like rubber web 69, which is provided with one or more bottom connectors 70 passing through holes in the bottom of pocket 46. The rubber web 69 is applied below the upper portion of the conveyor 5 since at that location, there is provided a spray system cleaning the oil recovery mat before it travels down into the water. The mixture of water and oil from the spraying action may flow down into the pocket 46. The timber dogs on the conveyors 51, 56 and 57 ar now removed in the extent that they are not suitable for the handling which is to be described, and rubber blocks or the like are instead mounted on the conveyors. This is carried out so as to make it possible to transport containers 71 in the hold 49 by means of said conveyors. The containers 71 may, in the empty state, be transported into the hold 49 by the conveyors 51, 57, 56 and in a filled state out of the hold by the reversibility of said conveyors. Since the load pocket 46 has been rigidly mounted and released from the load transportation device 47, the latter can be used to locate containers in several levels.

The recovered oil in the load pocket 46 is directed out through the outlet conduit 70 and a suitable pipe to a pump station adapted to pump the oil into the containers 71 via suitable hoses connectable to the containers. Alternatively, stationary devices may be built into the hull portions 1, 2 and be capable of being brought into communication with the containers.

With the full line 72 in FIG. 2, it is illustrated how the conveyors 51, 56 and 57 each is divided into at least two sections 51A and 51B respectively, 57A and 57B respectively and 56A and 56B respectively disposed side by side. The two sections of each of said conveyors may be driven in a reversible manner independently of each other. In this way, e.g. the conveyor sections 51A, 57A and 56A may be used to transport containers 71 into the hold 49 while the conveyor sections 56B, 57B and 51B are used to transport containers 71 out of the hold and vice versa. Thus, full containers may be continuously transported out of the hold and empty containers into the same. It is to be noted that the two conveyor sections of each of said conveyors may be driven in unison if desired, such as when handling timber.

When recovering timber from the bottom of the sea, sediments on the bottom, in which very poisonous pollutions from pulp mills are present, will be agitated. In order to collect these pollutions, the feed assembly 26 or the lower end 6 of the conveyor 5 may be provided with a suction nozzle to suck polluted water. This water is preferably pumped into a water cleaning device of a suitable kind located in the vessel. Polluted water will also accompany recovered logs. In order to collect this polluted water, the vessel has, obliquely below the conveyor 5, a sloping surface 73, on which polluted water may flow down and be collected in a channel 74 for further transport to the cleaning devices. Also waste water on the bottom of the hold 49 may be collected and transferred to the cleaning devices, from which the cleaned water is returned out of the vessel. The waste water from the previously described spraying of the conveyor 5 during oil recovery may also be allowed to flow down into the channel 74 for further transportation to the cleaning devices.

Figure 10:
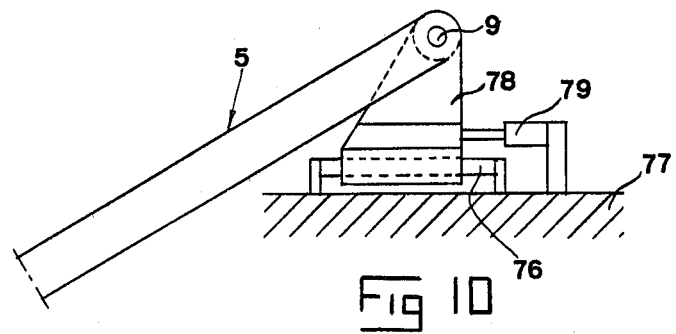
FIG. 10 is a diagrammatical side view illustrating the mounting of the upper end of the conveyor to the vessel.
Figure 11:
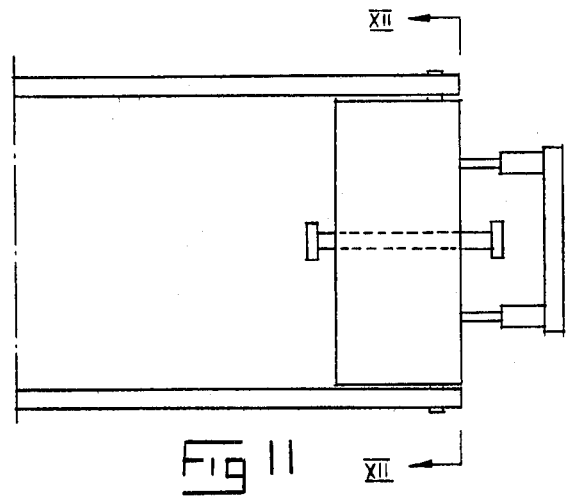
FIG. 11 is a plan view of FIG. 10.
Figure 12:
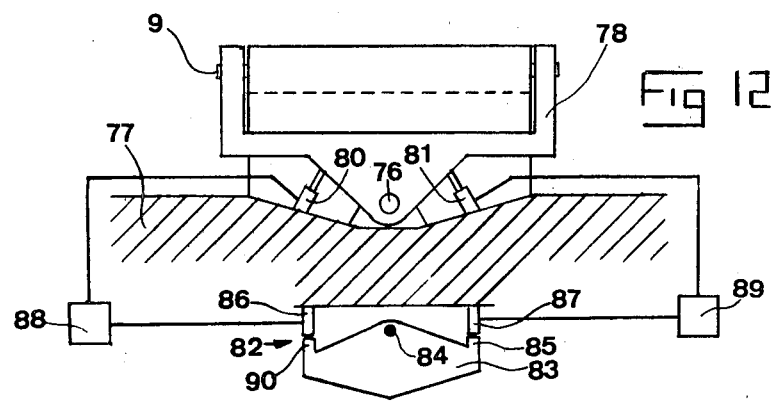
FIG. 12 is a view along the line XII—XII in FIG. 11 and diagrammatically illustrating an arrangement to rotate the conveyor in dependence upon side heeling of the vessel.

During motion of the sea, the vessel will heel sidewardly and to minimize the effect of such heelings on the conveyor 5 it is preferred to provide suitable resilient buffers 75 between the conveyor and the hull portions 1, 2 (FIG. 2). It is also preferred to make the conveyor 5 pivotable relative to the vessel about a second axis 76 (FIGS. 10-12) extending generally in the longitudinal direction of the vessel and generally perpendicularly to axis 9. In FIGS. 10 and 12, the vessel is diagrammatically denoted 77. A carrier 78 is pivotably connected to the conveyor 5 by means of axis 9 and the carrier is in turn pivotable about axis 76. In addition, the carrier 78 is displaceable to and fro along axis 76 so that the conveyor 5 may yield on abrupt contact with the bottom of the sea. The displacement of carrier 78 in a direction towards the stern is counteracted by a suitable buffer 79, e.g. of fluid cylinder type. The conveyor 5 is rotatable about axis 76 by means of two operating members 80, 81 of fluid cylinder type. The operation of the fluid cylinders 80, 81 is automatically controlled by a device 82 sensing side heelings of the vessel. The device 82 may comprise a member 83 freely rotatable under the influence of gravitation, said member having its axis 84 of rotation located straightly below axis 76 and extending in the longitudinal direction of the vessel. The member 83 is adapted to influence two sensing elements 86, 87 by means of two spaced portions 90, 85, said elements being adapted to provide, in dependence upon the position of member 83, varying control signals to two control components 88, 89 to control the fluid supply and fluid evacuation respectively to and from the fluid cylinders 80, 81. The sensing elements 86, 87 may be adapted to provide electrical signals having different character or magnitude in dependence upon the position of member 83. The device illustrated in FIG. 12 operates as follows: If the vessel would heel over to the left, the portion 90 of member 83 will approach the sensing element 86 and influence the same so that it delivers a signal to the control component 88, which in turn, by opening a valve or the like, supplies fluid to the cylinder 80, which will rotate the carrier 78 and the conveyor 5 in a clock-wise direction about axis 76. At the same time, the portion 85 of member 83 is moved away from the sensing element 87, which for this reason provides such a signal to the control component 89, that the fluid cylinder 81 is evacuated of pressurized fluid. If the vessel would heel over to the right, the opposite will occur so that the carrier 78 will be rotated in a counter-clockwise direction about axis 76. The device described will accordingly maintain the axis 9 of the conveyor generally horizontal or at least decrease the influence of heelings of the vessel on the position of the conveyor 5. In order to enable displacement of the carrier 78 along axis 76, the fluid cylinders 80 and 81 must of course be displaceably mounted to either the vessel or the carrier 78.

The advantages of the vessel according to the invention are evident in that the same may be used not only for oil recovery from the water surface but also to pick up solid objects from the bottom of the sea. The containers 71 (FIG. 5) for recovered oil may be driven out from the vessel immediately upon filling in order to be collected by means of a transportation vessel of the kind described in the Swedish patent specification 377 787. This transportation vessel may also be adapted to deliver empty containers to the vessel according to the invention. This is also due relative to the timber barges 66 described with reference to FIG. 3.

Modifications are of course possible within the scope of the appended claims.

What I claim is:

1. A vessel for recovering material such as oil from the water, comprising a first conveyor, which is pivotably mounted on the vessel about an axis extending generally horizontally and transversely relative to the longitudinal direction of the vessel, a portion of said first conveyor being adapted to be located below the water level so as to enable the first conveyor to transfer the oil out of the water, and a lifting device connected to the first conveyor to pivot the first conveyor about said axis, the improvement comprising said lifting device being designed to adjust the lower portion of the first conveyor into different levels below the water level to locate the lower portion of the first conveyor in the vicinity of the bottom of the sea to pick up material such as timber therefrom, wherein the first conveyor is rotatably mounted to the vessel about a second axis extending generally in the longitudinal direction of the vessel, and further wherein the first conveyor is rotatable about the second axis by means of at least one operating member, the actuation of which is automatically controlled by a device sensing side heelings of the vessel and which is adapted, upon side heelings of the vessel, to rotate the first conveyor about the second axis to entirely or partially eliminate the influence of said side heelings on the position of the first conveyor and the direction of the first axis.

2. A vessel according to claim 1, wherein said conveyor comprises a plurality of attachable sections, whereby the length of said first conveyor may be altered.

3. A vessel according to claim 2, wherein each of said attachable sections comprises an endless belt having removable gripping dogs, and wherein said multiplicity of attachable sections is adapted for application of a single continuous oil recovery mat thereover.

4. A vessel according to claim 1, wherein the vessel at its forward end has two hull portions spaced sidewardly from each other, said hull portions forming, between each other, an open space, in which the conveyor projects down below the water level.

5. A vessel according to claim 1, further comprising means for measuring the depth of the water ahead of the vessel, said measuring means producing an output signal upon changes in depth, and said output signal being used to put said lifting device in operation to achieve adjustment of the level of said lower portion of said first conveyor.

6. A vessel according to claim 1, further comprising a hold, a bottom conveyor therein, and a third conveyor, said third conveyor being pivotably movable between a downwardly pivoted position in which said third conveyor is adapted to transport goods into and out of said hold through an opening in said vessel, and an upwardly pivoted position in which said third conveyor forms a wall-like closure of said hold; and wherein said bottom conveyor and said third conveyor are adapted for transfer of material therebetween, the direction of transfer of the third conveyor in its upwardly pivoted position being at an angle to the direction of transfer of said bottom conveyor.

7. A vessel for recovering material such as oil from the water, comprising a first conveyor, which is pivotably mounted on the vessel about an axis extending generally horizontally and transversely relative to the longitudinal direction of the vessel, a portion of said first conveyor being adapted to be located below the water level so as to enable the first conveyor to transfer the oil out of the water, and a lifting device connected to the first conveyor to pivot the first conveyor about said axis, the improvement comprising said lifting device being designed to adjust the lower portion of the first conveyor into different levels below the water level to locate the lower portion of the first conveyor in the vicinity of the bottom of the sea to pick up material such as timber therefrom, wherein the first conveyor is rotatably mounted to the vessel about a second axis extending generally in the longitudinal direction of the vessel, and further wherein the first conveyor is displacably movable in a direction towards the stern along the second axis against the action of a buffer.

8. A vessel according to claim 7, wherein said conveyor comprises a plurality of attachable sections, whereby the length of said first conveyor may be altered.

9. A vessel according to claim 8, wherein each of said attachable sections comprises an endless belt having removable gripping dogs, and wherein said multiplicity of attachable sections is adapted for application of a single continuous oil recovery mat thereover.

10. A vessel according to claim 7, wherein the vessel at its forward end has two hull portions spaced sidewardly from each other, said hull portions forming, between each other, an open space, in which the conveyor projects down below the water level.

11. A vessel according to claim 7, further comprising means for measuring the depth of the water ahead of the vessel, said measuring means producing an output signal upon changes in depth, and said output signal being used to put said lifting device in operation to achieve adjustment of the level of said lower portion of said first conveyor.

12. A vessel according to claim 7, further comprising a hold, a bottom conveyor therein, and a third conveyor, said third conveyor being pivotably movable between a downwardly pivoted position in which said third conveyor is adapted to transport goods into and out of said hold through an opening in said vessel, and an upwardly pivoted position in which said third conveyor forms a wall-like closure of said hold; and wherein said bottom conveyor and said third conveyor are adapted for transfer of material therebetween, the direction of transfer of the third conveyor in its upwardly pivoted position being at an angle to the direction of transfer of said bottom conveyor.

13. A vessel for recovering material such as oil from the water, comprising a first conveyor, which is pivotably mounted on the vessel about an axis extending generally horizontally and transversely relative to the longitudinal direction of the vessel, a portion of said first conveyor being adapted to be located below the water level so as to enable the first conveyor to transfer the oil out of the water, and a lifting device connected to the first conveyor to pivot the first conveyor about said axis, the improvement comprising said lifting device being designed to adjust the lower portion of the first conveyor into different levels below the water level to locate the lower portion of the first conveyor in the vicinity of the bottom of the sea to pick up material such as timber therefrom, wherein the first conveyor at its lower end comprises an assembly to feed material on the bottom of the sea onto the first conveyor, and wherein the feed assembly is provided with at least two feed members, which are pivotably provided at the longitudinal sides of the first conveyor and movable between a first extended position and a second position, in which the members are retracted towards the lower end of the first conveyor, said feed members being adapted to be alternately pivoted to and fro between said positions and each of the feed members being connected to means to at least partially raise the feed member when it is to be pivoted from the retracted to the extended position.

14. A vessel according to claim 13, wherein said conveyor comprises a plurality of attachable sections, whereby the length of said first conveyor may be altered.

15. A vessel according to claim 14, wherein each of said attachable sections comprises an endless belt having removable gripping dogs, and wherein said multiplicity of attachable sections is adapted for application of a single continuous oil recovery mat thereover.

16. A vessel according to claim 13, further comprising means for measuring the depth of the water ahead of the vessel, said measuring means producing an output signal upon changes in depth, and said output signal being used to put said lifting device in operation to achieve adjustment of the level of said lower portion of said first conveyor.

17. A vessel according to claim 13, further comprising a hold, a bottom conveyor therein, and a third conveyor, said third conveyor being pivotably movable between a downwardly pivoted position in which said third conveyor is adapted to transport goods into and out of said hold through an opening in said vessel, and an upwardly pivoted position in which said third conveyor forms a wall-like closure of said hold; and wherein said bottom conveyor and said third conveyor are adapted for transfer of material therebetween, the direction of transfer of the third conveyor in its upwardly pivoted position being at an angle to the direction of transfer of said bottom conveyor.

18. A vessel according to claim 13, wherein the feed assembly is pivotably connected to the conveyor about a generally horizontal axis.

19. A vessel according to claim 13, wherein the vessel at its forward end has two hull portions spaced sidewardly from each other, said hull portions forming, between each other, an open space, in which the conveyor projects down below the water level.

* * * * *

UNITED STATES PATENT AND TRADEMARK OFFICE
CERTIFICATE OF CORRECTION

PATENT NO. : 4,394,841
DATED : July 26, 1983
INVENTOR(S) : Per B. Lundback

It is certified that error appears in the above—identified patent and that said Letters Patent is hereby corrected as shown below:

Column 2, line 31 delete "distance" insert

--distances--.

Signed and Sealed this

Twenty-seventh Day of March 1984

[SEAL]

Attest:

GERALD J. MOSSINGHOFF

Attesting Officer     Commissioner of Patents and Trademarks